(12) United States Patent
Mennen et al.

(10) Patent No.: US 9,501,996 B2
(45) Date of Patent: Nov. 22, 2016

(54) CONTROL METHOD

(71) Applicant: Amazon Technologies, Inc., Seattle, WA (US)

(72) Inventors: Johannes Wilhelmus Hendrikus Mennen, Budel (NL); Nicolas Eugene Bergeron, Stein (NL); Gor Manukyan, Veldhoven (NL); Jozef Elisabeth Aubert, Roermond (NL); Henricus Petronella Maria Derckx, Weert (NL)

(73) Assignee: Amazon Technologies, Inc., Seattle, WA (US)

( * ) Notice: Subject to any disclaimer, the term of this patent is extended or adjusted under 35 U.S.C. 154(b) by 67 days.

(21) Appl. No.: 14/038,460

(22) Filed: Sep. 26, 2013

(65) Prior Publication Data
US 2015/0084942 A1 Mar. 26, 2015

(51) Int. Cl.
*G09G 5/00* (2006.01)
*G02B 26/00* (2006.01)
*G09G 3/34* (2006.01)

(52) U.S. Cl.
CPC .............. *G09G 5/00* (2013.01); *G02B 26/005* (2013.01); *G09G 3/348* (2013.01); *G09G 2340/16* (2013.01)

(58) Field of Classification Search
CPC .................... G09G 2330/021; G09G 3/3233; G02B 26/004
USPC ........................................................ 345/212
See application file for complete search history.

(56) References Cited

U.S. PATENT DOCUMENTS

| | | | |
|---|---|---|---|
| 6,909,440 B1 | 6/2005 | Librandi et al. | |
| 7,193,625 B2* | 3/2007 | Danner et al. | 345/214 |
| 2006/0033727 A1 | 2/2006 | Hsu et al. | |
| 2006/0033737 A1 | 2/2006 | Old et al. | |
| 2010/0110532 A1* | 5/2010 | Takemoto | G02B 3/14 359/316 |
| 2010/0250766 A1* | 9/2010 | Riggert et al. | 709/231 |
| 2011/0007056 A1 | 1/2011 | Huitema | |
| 2011/0187696 A1* | 8/2011 | Slack et al. | 345/211 |
| 2012/0057217 A1 | 3/2012 | Ku et al. | |
| 2014/0247289 A1* | 9/2014 | Park | G09G 3/2055 345/690 |

OTHER PUBLICATIONS

Chiu, Yung-Hsiang et al., "An Accurate Gray-Level Driving Method for Quick Response Electrowetting Displays," Journal of the Society for Information Display, vol. 19, Issue 11, pp. 741-748, Nov. 2011.

* cited by examiner

Primary Examiner — Towfiq Elahi
(74) Attorney, Agent, or Firm — EIP US LLP

(57) ABSTRACT

An electrowetting element includes a first fluid and a second fluid immiscible with the first fluid, as well as a surface, wherein display effects depend on an extent that the first and second fluids adjoin the surface, in dependence on applied voltage. Operation includes receiving data representing a first display effect for display; receiving data representing a subsequent display effect for display after display of the first display effect; comparing data representing the first display effect with data representing said subsequent display effect to determine a difference indicative of a change of the extent the second fluid adjoins the surface between display of the first display effect and display of the subsequent display effect; and depending on said difference, selectively outputting data for driving the electrowetting element to display a different display effect, instead of the subsequent display effect, consecutively after displaying the first display effect.

31 Claims, 5 Drawing Sheets

CONTROL METHOD

BACKGROUND

Electrowetting display devices are known. In an off state of a picture element of such a device an oil layer covers a display area. In an on state the oil layer is retracted so as to cover less of the display area. To switch the picture element to the on state a voltage is applied via an electrically conductive fluid immiscible with the oil. To switch the picture element to the off state, the voltage is switched off. In examples where the oil is coloured, a radiation beam passing through the picture element when in the off state passes through the oil and is imparted with colour. However, when the picture element is in the on state, the beam passes through less of the oil meaning its colour remains predominantly unchanged or more weakly imparted with colour.

When switching such a picture element from the off state to an on state, the oil layer may fragment to an undesired configuration. This fragmentation can reduce a quality of a display effect provided by the picture element, for example due to the radiation beam being inconsistently imparted with colour.

It is desirable to improve a display effect provided by an electrowetting element.

DETAILED DESCRIPTION

Figure 1:
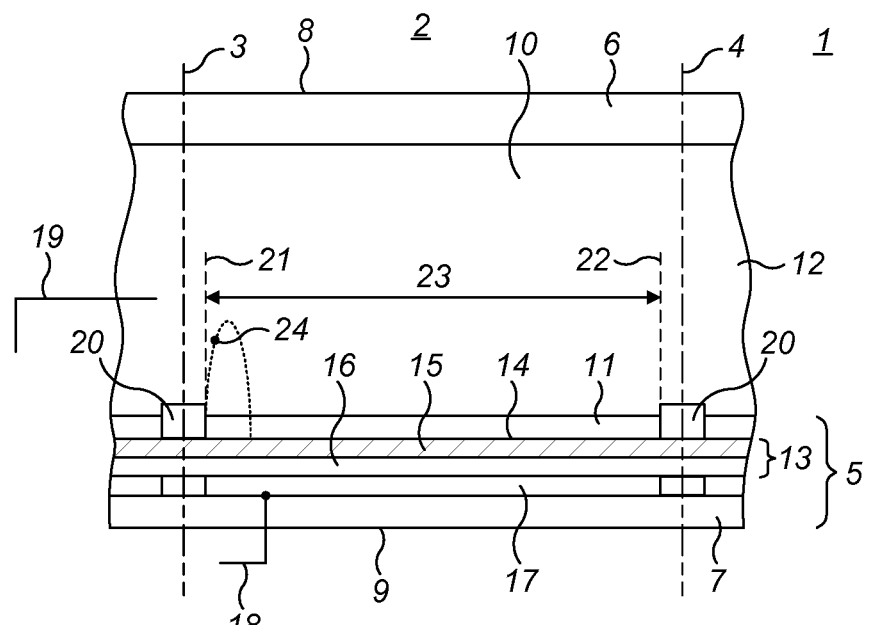
FIG. 1 shows schematically an example electrowetting element.

FIG. 1 shows a diagrammatic cross-section of part of an example of an electrowetting device. In this example the device is an electrowetting display device 1 including a plurality of electrowetting elements, which are picture elements 2, one of which is shown in the Figure. The lateral extent of the picture element is indicated in the Figure by two dashed lines 3, 4. The picture elements comprise a first support plate 5 and a second support plate 6. The support plates may be separate parts of each picture element, but the support plates may be shared in common by the plurality of picture elements. The support plates may include a glass or polymer substrate 6, 7 and may be rigid or flexible.

The display device has a viewing side 8 on which an image or display formed by the display device can be viewed and a rear side 9. In the Figure the first support plate 5 defines the rear side 9 and the second support plate 6 defines the viewing side; alternatively, the first support plate may define the viewing side. The display device may be of the reflective, transmissive or transflective type. The display device may be of a segmented display type in which the image may be built up of segments, each segment including several picture elements. The display device may be an active matrix driven display device, a direct drive display device or a passively driven display device. The plurality of picture elements may be monochrome. For a colour display device the picture elements may be divided in groups, each group having a different colour; alternatively, an individual picture element may be able to show different colours.

A space 10 between the support plates is filled with two fluids: a first fluid 11 and a second fluid 12 at least one of which may be a liquid. The second fluid is immiscible with the first fluid. The second fluid is electrically conductive or polar and may be water or a salt solution such as a solution of potassium chloride in water. The second fluid may be transparent, but may instead be coloured, white, absorbing or reflecting. The first fluid is electrically non-conductive and may for instance be an alkane like hexadecane or may be an oil such as silicone oil.

The first fluid absorbs at least a part of the optical spectrum. The first fluid may be transmissive for a part of the optical spectrum, forming a colour filter. For this purpose the first fluid may be coloured by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a colour.

The support plate 5 includes an insulating layer 13. The insulating layer may be transparent or reflective. The insulating layer 13 may extend between walls of a picture element. To avoid short circuits between the second fluid 12 and electrodes arranged under the insulating layer, layers of the insulating layer may extend uninterrupted over a plurality of picture elements 2, as shown in the Figure. The insulating layer has a surface 14 facing the space 10 of the picture element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon® AF1600. The barrier layer 16 may have a thickness, taken in a direction perpendicular the plane of the substrate, between 100 nanometers and 150 nanometers and may be made of an inorganic material like silicon oxide or silicon nitride or a stack of these (for example, silicon oxide-silicon nitride-silicon oxide) or an organic material like polyimide or parylene. The barrier layer may comprise multiple layers having different dielectric constants.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each element 2 includes an electrode 17 as part of the support plate 5. In examples shown there is one such electrode 17 per element. The electrode 17 is separated from the fluids by the insulating layer 13; electrodes of neighbouring picture elements are separated by a non-conducting layer. In some examples, further layers may be arranged between the insulating layer 13 and the electrode 17. The electrode 17 can be of any desired shape or form. The electrode 17 of a picture element is supplied with voltage signals by a signal line 18, schematically indicated in the Figure. A second signal line 19 is connected to an electrode that is in contact with the conductive second fluid 12. This electrode may be common to all elements, when they are fluidly interconnected by and share the second fluid, uninterrupted by walls. The picture element 2 can be controlled by a voltage V applied between the signal lines 18 and 19. The electrodes 17 on the substrate 7 are coupled to a display control apparatus. In a display device having the picture elements arranged in a matrix form, the electrodes can be coupled to a matrix of control lines on the substrate 7.

The first fluid 11 in this example is confined to one picture element by walls 20 that follow the cross-section of the picture element. The cross-section of a picture element may have any shape; when the picture elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the picture element, indicated by the dashed lines 3 and 4, is defined by the centre of the walls 20. The area of the surface 14 between the walls of a picture element, indicated by the dashed lines 21 and 22, is called the display area 23, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
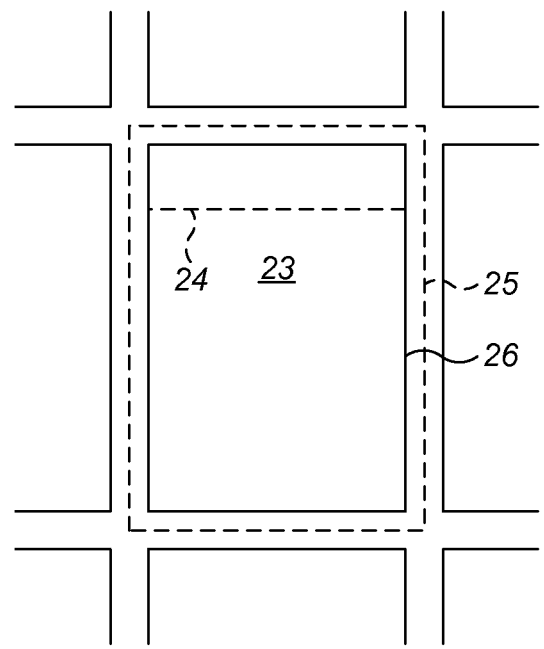
FIG. 2 shows a plan view of the example electrowetting element.

FIG. 2 shows a matrix of rectangular picture elements in a plan view of the hydrophobic layer of the first support plate. The extent of the central picture element in FIG. 2, corresponding to the dashed lines 3 and 4 in FIG. 1, is indicated by the dashed line 25. Line 26 indicates the inner border of a wall; the line is also the edge of the display area 23.

When no voltage is applied between the electrodes, i.e. when the electrowetting element is in an off state, the first fluid 11 forms a layer between the walls 20, as shown in the FIG. 1. Application of a voltage will contract the first fluid, for example against a wall as shown by the dashed shape 24 in FIG. 1. The controllable shape of the first fluid, in dependence on the magnitude of applied voltage, is used to operate the picture element as a light valve, providing a display effect over the display area 23. For example, switching the fluids to increase adjoinment of the second fluid with the display area may increase the brightness of the display effect provided by the element.

Figure 4:
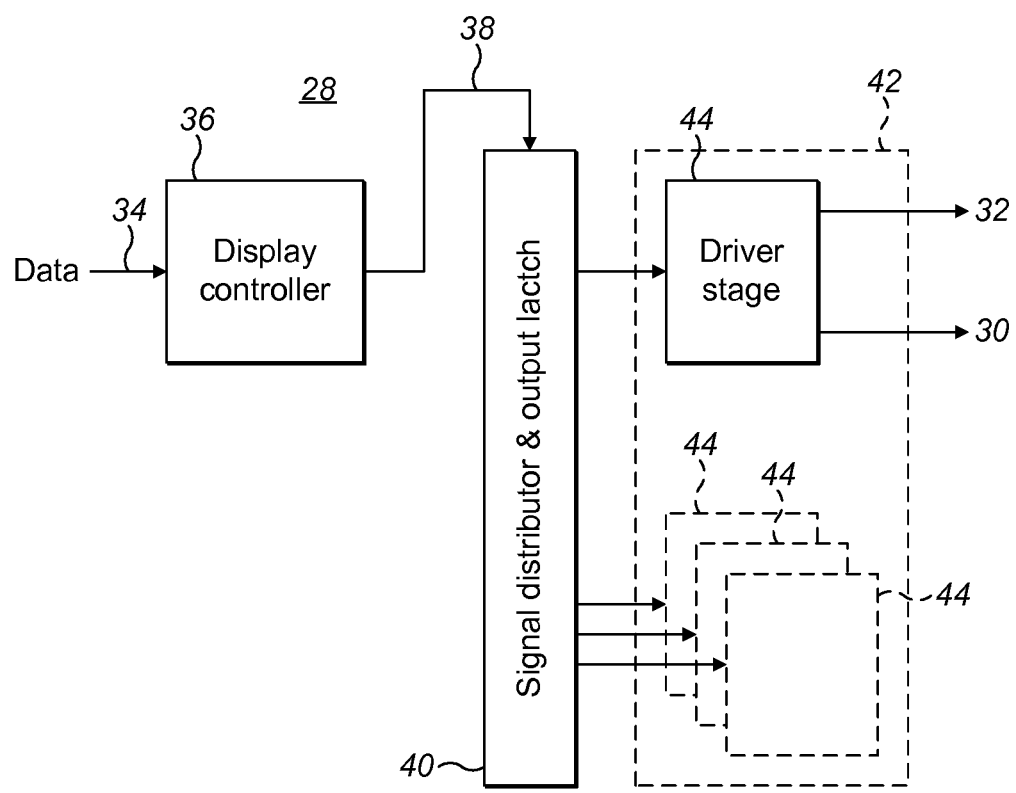
FIG. 4 shows schematically an example of apparatus for controlling an electrowetting element.

FIG. 4 shows schematically an example of control apparatus for controlling an electrowetting element such as that described above and for example for controlling a plurality of electrowetting elements arranged for example as a matrix in an electrowetting display device. The control apparatus in this example is for so-called direct driving of the electrowetting element(s) and may be in the form of an integrated circuit adhered to the support plate 6. An active matrix type display, which is well known in the art, may also use such a control apparatus. The control apparatus 28 includes control logic and switching logic. The apparatus is connected to each electrowetting element by means of signal lines 30 and a common signal line 32. Each electrode signal line 30 connects an output from the control apparatus 28 to a different electrode 17, respectively. The common signal line is connected to the second fluid 10 via an electrode. Also included are one or more input data lines 34, whereby the control apparatus can be instructed with data indicative of a desired display effect for each of the electrowetting elements; this input data may be video data, for example.

The example of the control apparatus includes a controller, such as a display controller 36 illustrated, e.g. a microcontroller, receiving input data from the input data lines 34 relating to an image to be.

The display controller is arranged for controlling a voltage applied between the electrode 17 and the second fluid, via the signal lines 30, 32, thereby providing an electric field in the electrowetting element, which determines a configuration of the first and second fluids, thereby determining the display effect provided by the electrowetting element. The display controller controls a timing and/or a signal level of at least one signal level for each picture element.

The output 38 of the display controller is connected to the data input of a signal distributor and data output latch 40. The signal distributor distributes incoming data over a plurality of outputs connected to the display device, via drivers for example. The signal distributor causes data input indicating that a certain picture element is to provide a specific display effect to be sent to the output connected to this element. The distributor may be a shift register. The input data is clocked into the shift register and at receipt of a latch pulse the content of the shift register is copied to the output latch. The output latch has a one or more outputs, connected to a driver assembly 42. The outputs of the latch are connected to the inputs of one or more driver stages 44 within the control apparatus. The outputs of each driver stage are connected through the signal lines 30 and 32 to a corresponding picture element. In response to the input data 34 a driver stage will output a voltage of the signal level set by the display controller to set one of the picture elements to provide a corresponding display effect.

When applying a voltage to switch the first and second fluids from the off state to an on state, the first fluid may contract as illustrated in FIG. 1. However, in some circumstances, the first fluid may not contract in this way; instead, the first fluid may fragment, i.e. split, to form a plurality of portions, i.e. fragments, of first fluid on the surface 14 rather than one contracted portion as shown by dashed line 24 in FIG. 1. Each fragment may be seemingly randomly distributed on the surface. This fragmentation can reduce a quality of a display effect provided by the electrowetting element. It is noted that fragmentation may occur when applying a voltage to the fluids when in an off state and in some circumstances when the fluids are in an on state.

Without being bound to any theory, it is believed that a cause of the fragmentation is due to motion of the first and second fluids initiating at a plurality of different locations on the surface substantially simultaneously, when applying a voltage to the fluids when in the off state, for example, rather than fluid motion initiating at one location before other locations on the surface. The term substantially simultaneously used herein means that the timing of fluid motion initiation at the different locations is such that fragmentation occurs. Fragmentation may in some cases occur due to initiation within the body of the first fluid on the surface rather than at a point along a peripheral edge, i.e. a rim, of the meniscus between the first and second fluids. The locations of the multiple initiations may be disconnected from each other, i.e. separate from each other on the surface, rather than being part of a continuous line along which fluid motion initiates. The multiple initiations may be caused by particles on the surface and/or manufacturing defects of the electrowetting element, for example. Fragmentation may occur when switching from a first display effect to a subsequent display effect, as will be explained later. It is noted that fragmentation may not occur when switching to decrease an extent of adjoinment of the second fluid on the surface of the display area, as will be explained later.

It has been realised that when switching the electrowetting element from one configuration of the first and second fluids to a different configuration, a likelihood of fragmentation of the first fluid depends on the difference between the applied voltage for the fluid configuration from which the fluids are being switched and the applied voltage of the fluid configuration to which the fluids are being switched. For example, the change in applied voltage required to switch the fluids from a configuration corresponding with the off state, which may provide a black display effect, directly to a fluid configuration where the first fluid is fully contracted, which may provide a white display effect, may be more likely to cause fragmentation than a change in applied voltage to switch the fluids from the configuration of the off state to a configuration with the first fluid adjoining 90% of the surface. Fragmentation may occur when too high a magnitude of voltage is applied too quickly; in examples described herein, the magnitude of voltage for switching may therefore be applied stepwise over a longer period of time, such as over a series of frames, thereby indirectly driving the element to a desired display effect via other display effects, which reduces or prevents fragmentation. Such indirect driving is counterintuitive, as a different display effect is displayed instead of a desired display effect.

Figure 3:
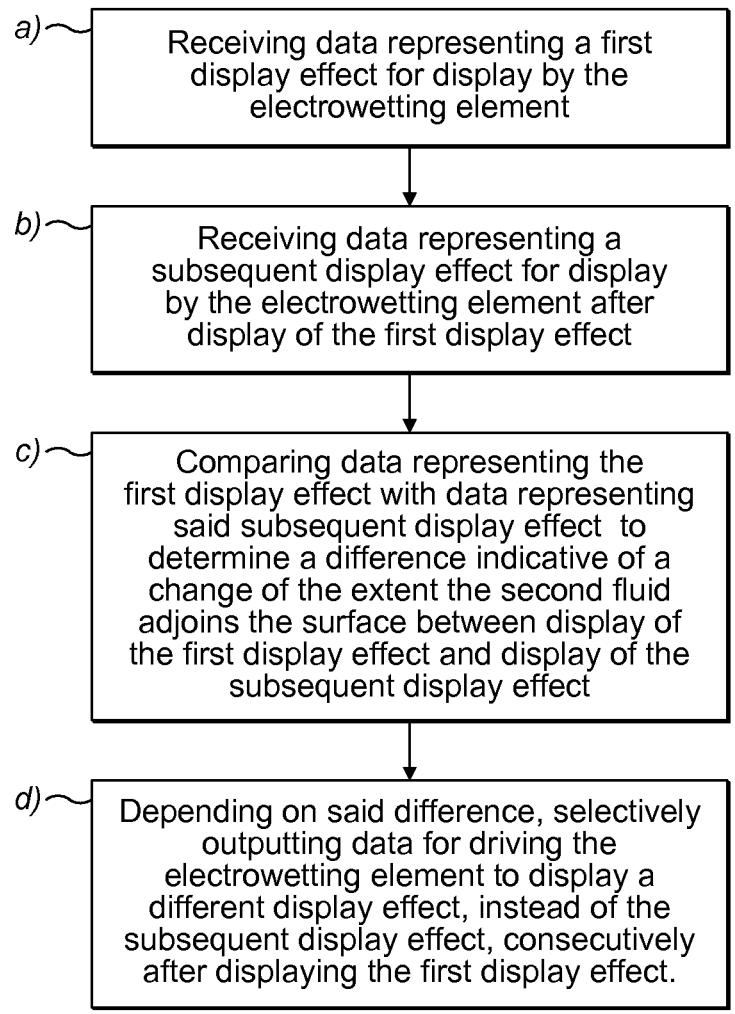
FIG. 3 shows a flow diagram of a method according to an example.

In accordance with examples to be described, there is provided a method of controlling an electrowetting element such as that described using FIGS. 1 and 2, the method being illustrated as a flow diagram in FIG. 3 and including:
 a) receiving data representing a first display effect for display by the electrowetting element;
 b) receiving data representing a subsequent display effect for display by the electrowetting element after display of the first display effect;
 c) comparing data representing the first display effect with data representing said subsequent display effect to determine a difference indicative of a change of the extent the second fluid adjoins the surface between display of the first display effect and display of the subsequent display effect; and
 d) depending on said difference, selectively outputting data for driving the electrowetting element to display a different display effect, instead of the subsequent display effect, consecutively after displaying the first display effect.

Such a method improves a quality of a display effect of the electrowetting element. By comparing the data representing the first display effect with the data representing the subsequent display effect, such as the second display effect as described below, the electrowetting element may be driven to reduce or eliminate the likelihood of fragmentation of the first fluid occurring by driving the element to the different display effect instead of the subsequent display effect, where appropriate. Despite providing the different display effect instead of the second display effect, the quality of the display effect displayed may be improved, as the likelihood of fragmentation of the first fluid occurring is reduced or eliminated.

The method according to examples described below may be performed whenever the electrowetting element is switched from one display effect to another display effect, which results in an increase or a decrease in the extent of the surface of the display area which is adjoined by the second fluid. However, fragmentation is observed when switching to increase the second fluid adjoinment with the surface, but not when switching to reduce the second fluid adjoinment, for example when switching to the off state. Therefore, in some examples, if the difference determined from the comparison indicates that switching of the electrowetting element from the first display effect to the subsequent display effect increases the extent the second fluid adjoins the surface, the outputting of data is selective, in dependence on the difference. Otherwise, if the difference indicates that switching the electrowetting element from the first display effect to the subsequent display effect decreases the extent the second fluid adjoins the surface, the outputting of data is for driving the electrowetting element to display the subsequent display effect consecutively after the first display effect.

An example of such a method will now be described with reference to FIGS. 5a to 5e. The display controller 36 is illustrated and includes a processor 44 and at least one memory 46 in this example.

Figure 5A:
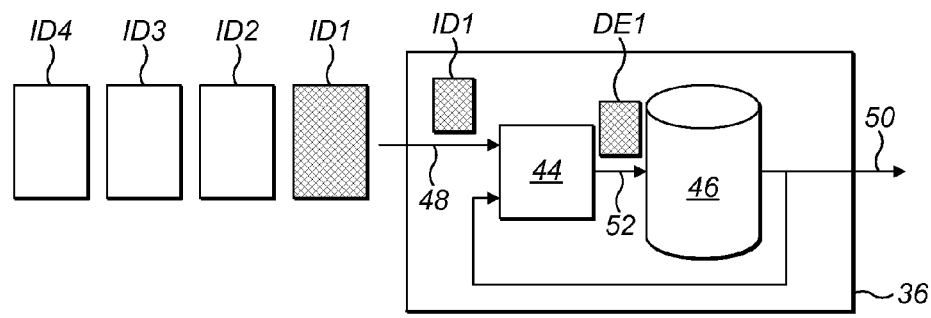
FIGS. 5a to 5e show schematically a method of controlling an electrowetting element according to an example.

Referring to FIG. 5a, input data IDn is input 48 to the display controller, specifically to the processor in this example, via an input interface (not shown) where ID represents input data and n denotes a display effect represented by the input data, intended for display by the electrowetting element. The input data IDn includes input data corresponding to a first display effect and one or more subsequent display effects; in this example the input data IDn includes input data ID1 corresponding to an input first display effect ID1 and input data ID2, ID3, ID4 corresponding respectively to a second, third and fourth subsequent input display effect. The display controller 36 outputs 50 data, via an output interface (not shown), for driving the electrowetting element to display at least one display effect DEn, where DE denotes display effect and n denotes the display effect represented by the output data. Referring to FIG. 5e, in this example, the output data for the display effect DEn includes data corresponding to, and which represents, a first display effect DE1 and one or more subsequent display effects; in this example the subsequent display effects include a second DE2, third DE3 and fourth DE4 display effect for the electrowetting element to display. The display effect DEn represented by the output data may be different from the display effect represented by the corresponding input data IDn, as explained below.

The input data and/or the output data may represent a voltage level value to be applied to the electrowetting element for displaying a predetermined display effect, corresponding to a predetermined greyscale level. Alternatively, the input data and/or the output data may represent a bit depth value for displaying a predetermined display effect. For example, in a 255 bit depth scheme, a bit depth of 0 may represent a black display effect, i.e. the off state of the electrowetting element; a bit depth of 255 may represent a white display effect, i.e. a display effect with the first fluid fully contracted. In this example the input data ID1, ID2, ID3, ID4 for the first, second, third and fourth display effects, respectively, represent bit depth values of 0, 255, 255, 255, respectively. In this example the output data for the first, second, third and fourth display effects DE1, DE2, DE3, DE4 represent bit depth values of 0, 100, 200, 255, respectively. Each subsequent display effect of the input and output data corresponds with a subsequent display frame for driving the electrowetting element, at a frame rate of 60 Hz for example.

FIGS. 5a to 5e show processing of the input data by the display controller for each input display effect in turn. In this way, a plurality of rounds of a) to d) described above may be performed.

Referring to FIG. 5a, the input data ID1 for the first display effect is input 48 to the processor 44. The input data ID1 represents a black display effect corresponding to an off state of the electrowetting element. The input data ID1 is processed by the processor 44 which, as illustrated by FIG. 5a, outputs 52 data representing the first display effect DE1 for display by the electrowetting element to the memory 46 for storage. Then, the data for the first display effect DE1 is output 50 for display by the electrowetting element. The output first display effect DE1 is the same as the first display effect of the input data ID1. In one example this is because the input data ID1 for the first display effect is the first in the sequence of input data, meaning there is not a previously input display effect to perform the comparison with.

Figure 5B:
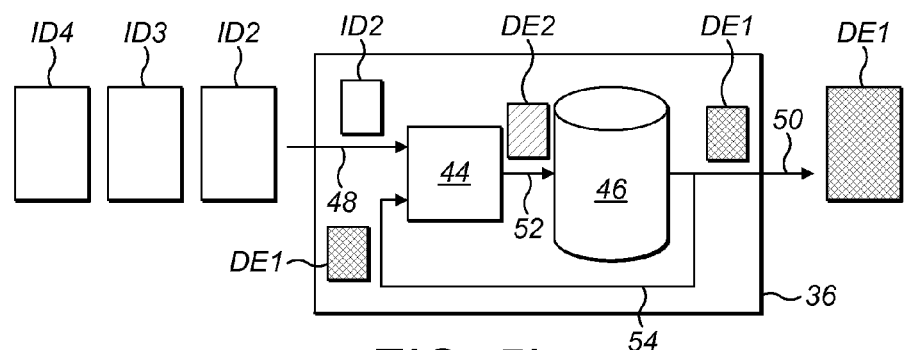

As the data representing the first display effect DE1 is output 50 from the memory 46, the input data ID2 for the second display effect is input 48 to the processor 44, as shown in FIG. 5b. The processor 44 therefore receives data representing a subsequent display effect, in this case the input data ID2 for the second display effect. Further, the output data representing the first display effect DE1 is input 54 to the processor 44. The display controller, specifically the processor in this example, therefore receives data DE1 representing the first display effect. The data representing the first display effect DE1 may be data output from a previous round of performing a) to d) of the method described above.

The processor compares the data representing the first display effect DE1 with the data representing the second display effect of the input data ID2 to determine a difference between the first display effect DE1 and the second display effect of the input data ID2. The comparison therefore includes processing a data value representing the first display effect with a data value representing the subsequent display effect to calculate a data value representing the difference. This difference is indicative of a change of the extent that the second fluid adjoins the surface of the display area between the first display effect DE1 which will be displayed and the second display effect which is intended to be displayed. This difference is therefore indicative of a change in applied voltage that would need to be applied to switch the electrowetting element from displaying the first display effect DE1 to display the intended second display effect.

Depending on the difference, the processor outputs data representing the second display effect DE2 which is either: for driving the electrowetting element to display the second display effect of the input data ID2 consecutively after displaying the first display effect DE1, or for driving the electrowetting element to display, consecutively after displaying the first display effect DE1, a different second display effect than the second display effect of the input data ID2. Thus, it is evaluated in dependence on the difference whether to drive the electrowetting element to display the different second display effect instead of the intended second display effect. In using the term consecutively herein, it is to be understood that although a period of time between each driving action to drive the element to display a display effect may vary in duration, there are no driving actions to drive the element to other display effects in between those periods of time. In this way, the element is driven to display the second display effect or the different second display effect, depending on the difference, immediately after the period of time which the element is driven to display the first display effect.

In this example, the data representing the second display effect DE2 output 52 by the processor is data representing a second display effect DE2 with a bit depth value of 100, which is different from the data representing the second display effect of the input data with a bit depth value of 255. Therefore the electrowetting element is driven first to a black first display effect and then to a second display effect of dark grey rather than the intended white second display effect of the input data ID2. The dark grey display effect therefore has a higher brightness than the black display effect.

Determining whether to output data representing a second display effect DE2 which is the same or different to the input data ID2 representing the second display effect depends on whether the difference from the comparison is equal to or less than a threshold value, or whether the difference is greater than the threshold value. If the difference is less than or equal to the threshold value, the output second display effect DE2 is the same as the second display effect of the input data ID2. However, if the difference exceeds the threshold value, the output second display effect DE2 is different from the second display effect of the input data ID2.

The threshold value in this example corresponds with a maximum change in the extent the second fluid adjoins the surface of the display area, when switching the electrowetting element from one display effect to another display effect, without fragmentation of the first fluid occurring. Therefore the threshold value may correspond with the maximum tolerated change in display effect before fragmentation occurs. The threshold value may correspond with a bit depth value or a voltage value, each corresponding with a predetermined change of extent of the second fluid adjoining the surface of the display area which can cause fragmentation. The present example is described in relation to bit depth values for the threshold value and the data representing display effects, but further examples are envisaged where the threshold value and data representing display effects instead relates to a voltage value.

Therefore, if the input data ID2 for the second display effect exceeds the threshold value, meaning the change of display effect from the first display effect DE1 to the intended second display effect would cause fragmentation, the processor outputs data representing a different second display effect DE2 from the intended second display effect of the input data ID2. In this example, the processor therefore limits, i.e. restricts, the display effect change from the first display effect DE1, to reduce or prevent fragmentation occurring. In this example, the processor outputs data for the second display effect DE2 to be displayed representing the first display effect plus the threshold value, i.e. data representing a sum of a data value representing the first display effect and a data value representing the threshold value. Therefore, in this example where the input data and the output data represent bit depth values and the threshold value is a bit depth value, in this example a threshold value of 100, the difference between the data value representing the first display effect DE1 and the data value representing the second display effect of the input data ID2 is: 255–

0=255, which exceeds the threshold value; the output second display effect DE2 is therefore: 0+100=100.

As described above, fragmentation may occur when switching of the display effect increases adjoinment of the second fluid with the surface of the display area. Therefore, in the present example, where the output second display effect DE2 is different from the intended second display effect of the input data ID2 and has a greater extent of second fluid adjoinment with the surface than the first display effect DE1, the different second display effect DE2 is output. If this is not the case, i.e. that the intended second display effect has a lower extent of second fluid adjoinment with the surface compared with the first display effect DE1, the output data representing the second display effect DE2 is the same as the intended second display effect of the input data ID2.

The process described using FIG. 5b is repeated for each of the input data IDn display effects in turn, as will now be explained using FIGS. 5c to 5e.

Figure 5C:
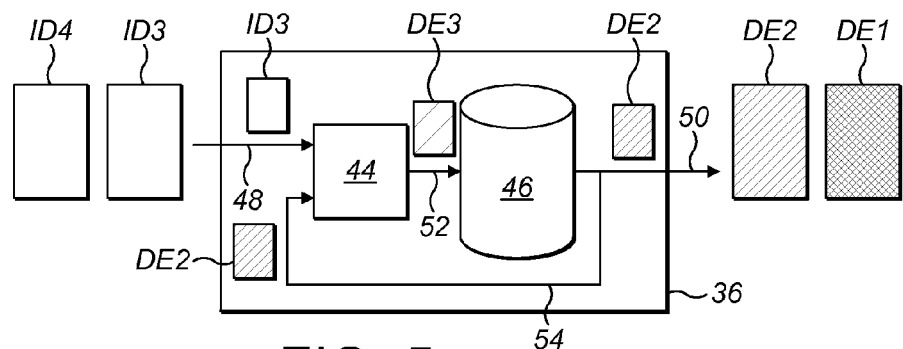

Referring to FIG. 5c, the data for the second display effect DE2 has now been output 50 for display by the electrowetting element consecutively after the first display effect DE1. The input data ID3 for the third display effect is input 48 to the processor 44 and compared with the data representing the second display effect DE2 by feeding back 54 the second display effect data DE2 to the processor. In this example, the input data ID3 represents a bit depth value of 255, i.e. a white state. The difference between the data representing the second display effect DE2 of a bit depth value of 100 and the input data ID3 of a bit depth value of 255 is greater than the threshold value of 100. Therefore, the processor outputs data representing a different third display effect DE3 than the intended third display effect; the third display effect DE3 is therefore represented by a data value of the second display effect DE2 bit depth value plus the threshold value, i.e. 100+100=200, which corresponds with a light grey third display effect DE3 instead of the intended white display effect with bit depth value 255.

Figure 5D:
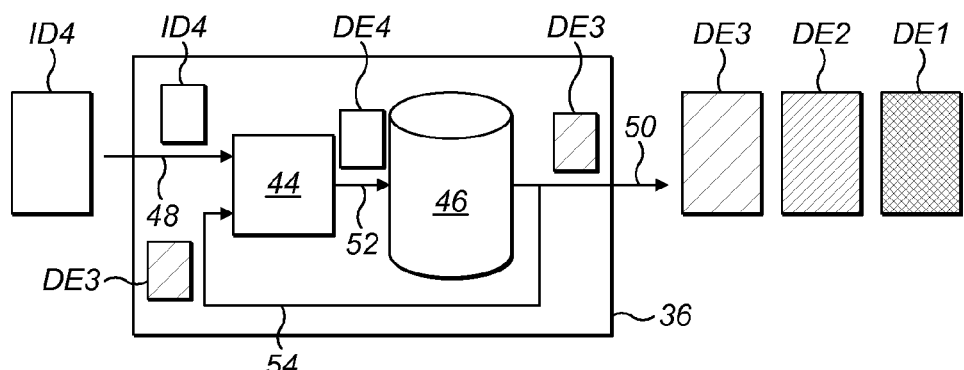
Figure 5E:
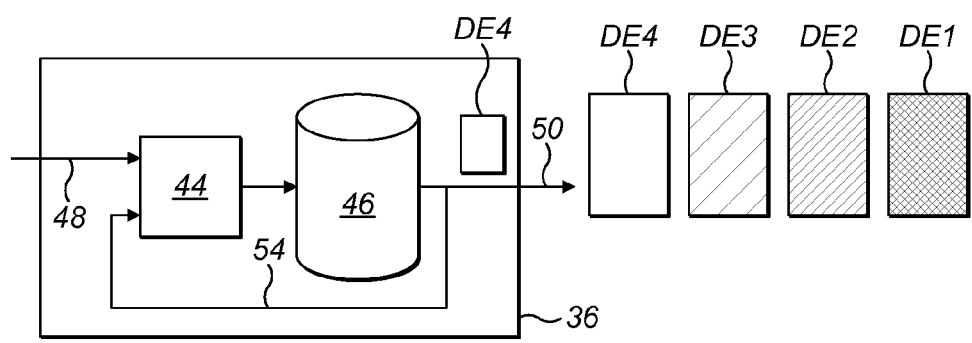

Referring to FIG. 5d, the data for the third display effect DE3 has now been output 50 for display by the electrowetting element consecutively after the second display effect DE2. The input data ID4 for the fourth display effect is input 48 to the processor 44 and compared with the data representing the third display effect DE3. In this example, the input data ID4 represents a bit depth value of 255, i.e. a white state. The difference between the data representing the third display effect DE3 of a bit depth value of 200 and the input data ID4 of 255 is less than the threshold value of 100. Therefore, the processor outputs data representing a fourth display effect DE4 which is the same as the intended fourth display effect of the input data ID4, i.e. a bit depth value of 255.

Referring to FIG. 5e, there is no further input data and the fourth display effect DE4 has now been output for display by the electrowetting element.

The algorithm performed by the processor and described with the example of FIGS. 5a to 5e may be denoted as follows:

If $(IDn-DEn-1)>T$ then $DEn=IDn+T$ else $DEn=IDn$ where T is the threshold value. Thus, for the example of FIGS. 5a to 5e, the input data for each display effect are bit depth values ID1=0, ID2=255, ID3=255, ID4=255 and the corresponding output data representing the display effects are bit depth values DE1=0, DE2=100, DE3=200, DE4=255.

It will be appreciated that although the example described with FIGS. 5a to 5e relates to one electrowetting element, the method may be performed for each electrowetting element of a plurality of electrowetting elements of a display device. Therefore the memory 46 may store data representing the display effect of each electrowetting element for one display frame. The memory therefore acts as a frame buffer.

Further examples are envisaged. For example, in the example described above using FIGS. 5a to 5e, the second, third and fourth input data representing display effects have a bit depth of 255, giving a sufficient number of frames for driving the electrowetting element from displaying the first display effect DE1 with bit depth 0 to displaying the fourth display effect with bit depth 255 stepwise, in increments of bit depth values of 100 in accordance with the algorithm. However, in further examples, the first display effect may have a bit depth value of 0, the second intended display effect may have a bit depth of 200 and a third display effect may have a bit depth value of 0; there are therefore insufficient frames of the second display effect stepwise by the threshold value of 100 to drive the electrowetting element to the ultimately desired bit depth of 200. One example to deal with this is to apply the algorithm described above, meaning that the second display effect has a bit value of 100, for example. Another example is to insert at least one intermediate frame consecutively after the first frame, i.e. between the first frame corresponding with the first display effect and the second frame corresponding with the second display effect. The at least one intermediate frame may correspond with at least one different display effect outputted on the basis of the comparison described above, i.e. in accordance with ii. After driving the electrowetting element to the different display effect of the intermediate frame, data may be output for driving the electrowetting element to display the second display effect in accordance with the intended second display effect. In this way, by adding the intermediate frame, the electrowetting element may be driven to bit depth values of 0 then 100 then 200, with the 0 and 200 values corresponding with the first and second frames, respectively. Adding such an intermediate frame in this example therefore doubles the frame rate of driving the electrowetting element from the first display frame to the second display frame, yielding a desired display effect without a slower frame rate. This principle may be applied in further examples to add more than one intermediate display effect; this may increase the frame rate further.

In further examples, there may be more than one threshold value, depending on the display effect from which the electrowetting element is being switched. For example, when switching from the off state, a greater voltage may be required to effect a given change of the extent the second fluid adjoins the surface, compared with a voltage required when switching from a display effect where the electrowetting element is not in the off state. This is for example due to having to overcome additional surface tension forces of the fluids with the surface and the walls when switching from the off state. The threshold value may therefore equal or exceed a minimum threshold value for switching the electrowetting element from the off state. Further, with the electrowetting element in the off state, the first fluid layer has a thickness which may be thinner than a thickness of first fluid when partially contracted for a display effect which is not the off state. With a thinner first fluid, the first fluid may be more likely to fragment than a thicker first fluid layer. Therefore, a different threshold value may be used in dependence on the display effect from which the electrowetting element is being switched; for example, a lower threshold value may be used when switching from the off state, but a greater threshold value may be used when switching from an on state with a thicker first fluid layer. In some examples the threshold value may increase when switching from a display effect with an increasingly contracted first fluid.

Although an example of a threshold value of 100 is given above, it is envisaged that in alternative examples the threshold value may be different, as the threshold value(s) depends on the likelihood of fragmentation in dependence on the specific construction parameters of the electrowetting element and the magnitude of voltages used for driving. The threshold value(s) may be determined upon manufacture of the electrowetting element and the display controller may be programmed accordingly with the threshold value(s) at that time.

The example given above using FIGS. 5a to 5e gives no display effect preceding the input data ID1 for the first display effect. This may be because the electrowetting element is in an off state prior to the input data being received. If this is the case, data representing a display effect corresponding to the off state may be used by the processor as a starting display effect of the element, for comparison with the input data ID1 of the first display effect, to determine the first display effect DE1 for driving the element. In the example given above, the input data ID1 corresponds to the off state and therefore the first display effect DE1 is output to the element rather than a different display effect.

In examples above, a subsequent display effect used for the comparison is the second display effect. It is envisaged in further examples that a different or a plurality of subsequent display effects may be used in the comparison to determine output data for determining a display effect of the electrowetting element.

In examples above, the threshold value corresponds with a maximum change in the extent the second fluid adjoins the surface of the display area, without fragmentation occurring. In other examples, the threshold value may correspond with a lower than maximum change in the extent of second fluid adjoinment, without fragmentation occurring.

In examples described above, the display controller includes a processor. This processor may be a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, such as the memory 46 described above. The processor may additionally, or in the alternative, contain memory, such as processor registers. Any of these memories may store display effect data as described above. Such a memory may also be a non-transitory computer readable storage medium having computer readable instructions, i.e. computer software, which when executed cause the at least one processor to perform a method according to examples described herein, for example the algorithm described above. Such computer software is therefore adapted to perform the method of examples herein. The one or more memories may include processor cache, including a multi-level hierarchical cache in which different levels have different capacities and access speeds. The memory may further include random access memory (RAM) and other volatile storage devices.

The display controller may be configured to drive the electrowetting elements using an analogue driving scheme. Alternative driving schemes are envisaged. For example, a semi-analogue scheme (analogue with pulse width modulation (PWM)) may be used. In such a semi-analogue scheme, the display effect is determined by a combination of the amplitude of the voltage and the length of time that the voltage is applied for. In other examples, a pulse width modulation scheme may be used.

It is to be understood that any feature described in relation to any one example may be used alone or in combination with other features described and may also be used in combination with one or more features of any other of the examples, or any combination of any other of the examples. Furthermore, equivalents and modifications not described above may also be employed without departing from the scope of the accompanying claims.

What is claimed is:

1. A method of controlling an electrowetting element comprising:
   a) receiving first display effect data representing a first display effect with a first extent of a surface of a support plate of the electrowetting element adjoined by a second fluid, the second fluid immiscible with a first fluid of the electrowetting element;
   b) receiving subsequent display effect data representing a subsequent display effect with a second extent of the surface adjoined by the second fluid, for display by the electrowetting element after display of the first display effect;
   c) comparing the first display effect data with the subsequent display effect data;
   d) determining that there is a difference between the first extent of the surface and the second extent of the surface;
   e) outputting sum data representing a sum of:
      a first display effect data value representing the first display effect, and
      a threshold data value representing a threshold value; and
   f) on the basis of the sum data, driving the electrowetting element to display, consecutively after displaying the first display effect, a different display effect instead of the subsequent display effect.

2. The method according to claim 1, comprising determining that a magnitude difference indicative of a magnitude of change between the first extent of the surface and the second extent of the surface exceeds the threshold value.

3. The method according to claim 2, wherein the threshold value corresponds with a maximum change in extent of the surface adjoined by the second fluid, upon switching the electrowetting element from displaying one display effect to displaying another display effect, without fragmentation of the first fluid.

4. The method according to claim 3, wherein the fragmentation of the first fluid is due to an initiation of motion of the first fluid and the second fluid, upon switching the electrowetting element, occurring substantially simultaneously at a plurality of disconnected locations on the surface.

5. The method according to claim 2, wherein the threshold value corresponds with one or more of a bit depth value or a voltage value.

6. The method according to claim 1, wherein the first display effect data indicates a bit depth value of the first display effect, and the threshold data value indicates a bit depth value difference between a bit depth value of one display effect and a bit depth value of an other display effect, the bit depth value difference representing a change in extent of the surface adjoined by the second fluid, upon switching the electrowetting element from displaying the one display effect to displaying the other display effect, without fragmentation of the first fluid.

7. The method according to claim 1, wherein the first display effect data value indicates a voltage to apply to display the first display effect, and the threshold data value indicates a voltage difference between a voltage for displaying one display effect and a voltage for displaying an other display effect, the voltage difference representing a change in extent of the surface adjoined by the second fluid, upon switching the electrowetting element from displaying the one display effect to displaying the other display effect, without fragmentation of the first fluid.

8. The method according to claim 1, wherein the first display effect has a lower brightness than the subsequent display effect.

9. The method according to claim 1, comprising driving the electrowetting element to display the subsequent display effect, after the driving the electrowetting element to display, consecutively after displaying the first display effect, the different display effect,
wherein the first display effect and the subsequent display effect correspond with a first frame and a subsequent frame, respectively, for driving the electrowetting element, and the different display effect corresponds with an intermediate frame added between the first frame and the subsequent frame.

10. The method according to claim 9, wherein the intermediate frame added between the first frame and the subsequent frame doubles a frame rate of driving the electrowetting element from the first frame to the subsequent frame.

11. The method according to claim 1, wherein the comparing comprises processing a first display effect data value representing the first display effect with a subsequent display effect data value representing the subsequent display effect to calculate a difference data value representing a magnitude difference indicative of a magnitude of change between the first extent of the surface and the second extent of the surface.

12. The method according to claim 11, wherein the first display effect data value and the subsequent display effect data value are each a respective bit depth value or a respective voltage value.

13. The method according to claim 1, wherein the first display effect data is outputted data for driving the electrowetting element to display the first display effect and the subsequent display effect data is inputted data indicating an intended display effect for the electrowetting element to display.

14. The method according to claim 13, comprising performing a plurality of rounds of a) to e), wherein the first display effect data for one round of performing a) to e) is outputted data from a previous round of performing a) to e).

15. The method according to claim 13, wherein the first display effect data is outputted from at least one memory storing the first display effect data.

16. An apparatus for controlling an electrowetting element, the apparatus comprising:
at least one processor; and
at least one memory comprising computer program instructions,
the at least one memory and the computer program instructions being configured to, with the at least one processor, cause the apparatus to perform:
a method of controlling the electrowetting element comprising:
a) receiving first display effect data representing a first display effect with a first extent of a surface of a support plate of the electrowetting element adjoined by a second fluid, the second fluid immiscible with a first fluid of the electrowetting element;
b) receiving subsequent display effect data representing a subsequent display effect with a second extent of the surface adjoined by the second fluid, for display by the electrowetting element after display of the first display effect;
c) comparing the first display effect data with the subsequent display effect data;
d) determining that there is a difference between the first extent of the surface and the second extent of the surface;
e) outputting sum data representing a sum of:
a first display effect data value representing the first display effect, and
a threshold data value representing a threshold value; and
f) on the basis of the sum data, driving the electrowetting element to display, consecutively after displaying the first display effect, a different display effect instead of the subsequent display effect.

17. The apparatus according to claim 16, the method comprising determining that a magnitude difference indicative of a magnitude of change between the first extent of the surface and the second extent of the surface exceeds the threshold value.

18. The apparatus according to claim 17, wherein the threshold value corresponds with a maximum change in extent of the surface adjoined by the second fluid, upon switching the electrowetting element from displaying one display effect to displaying another display effect, without fragmentation of the first fluid.

19. The apparatus according to claim 18, wherein the fragmentation of the first fluid is due to an initiation of motion of the first fluid and the second fluid, upon switching the electrowetting element, occurring substantially simultaneously at a plurality of disconnected locations on the surface.

20. The apparatus according to claim 16, wherein the comparing comprises processing a first display effect data value representing the first display effect with a subsequent display effect data value representing the subsequent display effect to calculate a difference data value representing a magnitude difference indicative of a magnitude of change between the first extent of the surface and the second extent of the surface.

21. The apparatus according to claim 16, wherein the first display effect data is outputted data for driving the electrowetting element to display the first display effect and the subsequent display effect data is inputted data indicating an intended display effect for the electrowetting element to display.

22. An electrowetting display device comprising:
a plurality of electrowetting elements, an electrowetting element of the plurality of electrowetting elements comprising:
a first fluid;
a second fluid immiscible with the first fluid;
a support plate having a surface; and an electrode for applying a voltage for switching a configuration of the first fluid and the second fluid, at least one processor, and at least one memory comprising computer program instructions, the at least one memory and the computer program instructions being configured to, with the at least one processor, cause the apparatus to, cause the apparatus to perform:

a method of controlling the electrowetting element comprising:

a) receiving first display effect data representing a first display effect with a first extent of the surface adjoined by a second fluid, the second fluid immiscible with a first fluid of the electrowetting element;

b) receiving subsequent display effect data representing a subsequent display effect with a second extent of the surface adjoined by the second fluid, for display by the electrowetting element after display of the first display effect;

c) comparing the first display effect data with the subsequent display effect data;

d) determining that there is a difference between the first extent of the surface and the second extent of the surface; and e) outputting sum data representing a sum of:
a first display effect data value representing the first display effect, and
a threshold data value representing a threshold value; and f) on the basis of the sum data, driving the electrowetting element to display, consecutively after displaying the first display effect, a different display effect instead of the subsequent display effect.

23. The electrowetting display device according to claim 22, in which the method comprises determining that a magnitude difference indicative of a magnitude of change between the first extent of the surface and the second extent of the surface exceeds the threshold value.

24. The electrowetting display device according to claim 23, in which the threshold value corresponds with a maximum change in extent of the surface adjoined by the second fluid, upon switching the electrowetting element from displaying one display effect to displaying another display effect, without fragmentation of the first fluid.

25. The electrowetting display device according to claim 24, wherein the fragmentation of the first fluid is due to an initiation of motion of the first fluid and the second fluid, upon switching the electrowetting element, occurring substantially simultaneously at a plurality of disconnected locations on the surface.

26. The electrowetting display device according to claim 22, wherein the comparing comprises processing a first display effect data value representing the first display effect with a subsequent display effect data value representing the subsequent display effect to calculate a difference data value representing a magnitude difference indicative of a magnitude of change between the first extent of the surface and the second extent of the surface.

27. The electrowetting display device according to claim 22, wherein the first display effect data is outputted data for driving the electrowetting element to display the first display effect and the subsequent display effect data is inputted data indicating an intended display effect for the electrowetting element to display.

28. The method according to claim 1, wherein, with the electrowetting element displaying the different display effect, the second fluid adjoins a different extent of the surface, the different extent of the surface being larger than the first extent of the surface and smaller than the second extent of the surface.

29. The method according to claim 1, wherein the determining that there is the difference comprises calculating that the first extent is smaller than the second extent.

30. The apparatus according to claim 16, wherein the determining that there is the difference comprises calculating that the first extent is smaller than the second extent.

31. The electrowetting display device according to claim 22, wherein the determining that there is the difference comprises calculating that the first extent is smaller than the second extent.

* * * * *

UNITED STATES PATENT AND TRADEMARK OFFICE
CERTIFICATE OF CORRECTION

| | |
|---|---|
| PATENT NO. | : 9,501,996 B2 |
| APPLICATION NO. | : 14/038460 |
| DATED | : November 22, 2016 |
| INVENTOR(S) | : Mennen et al. |

Page 1 of 1

It is certified that error appears in the above-identified patent and that said Letters Patent is hereby corrected as shown below:

In the Claims

In Column 15, Line 8, in Claim 22, delete "processor, cause the apparatus to," and insert -- processor, --, therefor.

Signed and Sealed this
Seventeenth Day of January, 2017

Michelle K. Lee
*Director of the United States Patent and Trademark Office*